United States Patent

Park

[11] Patent Number: 5,831,544
[45] Date of Patent: Nov. 3, 1998

[54] METHOD AND APPARATUS FOR SAVING BATTERY POWER IN A PAGING RECEIVER

[75] Inventor: Keon-Young Park, Oumi, Rep. of Korea

[73] Assignee: SamSung Electronics Co., Ltd., Suwon, Rep. of Korea

[21] Appl. No.: 673,815

[22] Filed: Jun. 27, 1996

[30] Foreign Application Priority Data

Jun. 28, 1995 [KR] Rep. of Korea .................. 17845/1995

[51] Int. Cl.$^6$ ........................................................ G08L 5/22
[52] U.S. Cl. .................................. 340/825.44; 455/38.3; 455/343
[58] Field of Search ........................ 340/825.52, 825.44, 340/825.48; 455/38.3, 13.2, 38.2, 343; 395/750

[56] References Cited

U.S. PATENT DOCUMENTS

| | | | |
|---|---|---|---|
| 4,961,073 | 10/1990 | Drapac et al. ........................ | 340/825.44 |
| 4,995,099 | 2/1991 | Davis ..................................... | 455/343 |
| 5,150,361 | 9/1992 | Wieczorek et al. .................... | 370/95.1 |
| 5,376,929 | 12/1994 | Rakolta et al. ....................... | 340/825.44 |
| 5,376,975 | 12/1994 | Romero et al. ....................... | 340/825.44 |
| 5,381,133 | 1/1995 | Erhart et al. ......................... | 340/825.44 |
| 5,384,564 | 1/1995 | Wycoff et al. ........................ | 340/825.44 |
| 5,396,660 | 3/1995 | Cannon ................................. | 455/343 |
| 5,410,734 | 4/1995 | Choi et al. ............................. | 455/38.3 |
| 5,414,419 | 5/1995 | Schwendeman et al. ............ | 340/825.44 |
| 5,430,437 | 7/1995 | Ichikawa et al. .................... | 340/825.44 |
| 5,459,457 | 10/1995 | Sharpe ................................... | 340/825.44 |
| 5,463,383 | 10/1995 | Pache .................................... | 340/825.44 |
| 5,475,374 | 12/1995 | Moore ................................... | 340/825.44 |
| 5,493,282 | 2/1996 | Petreye et al. ....................... | 340/825.27 |
| 5,497,145 | 3/1996 | Yung et al. ........................... | 340/825.44 |

*Primary Examiner*—Michael Horabik
*Assistant Examiner*—Arthur Farabee
*Attorney, Agent, or Firm*—Robert E. Bushnell, Esq.

[57] ABSTRACT

A method and apparatus for saving battery power in a paging receiver includes: supplying power to the receiver for a predetermined time period in an idle mode; analyzing data received during the predetermined time period and checking whether or not the data is a preamble; if it is determined that the data is a preamble, checking whether or not the preamble is an initial preamble; if it is determined that the preamble is an initial preamble, turning off the power supplied to the receiver until the end of the preamble; and at the end of the preamble, supplying power to the receiver to detect wordsync data.

8 Claims, 6 Drawing Sheets

METHOD AND APPARATUS FOR SAVING
BATTERY POWER IN A PAGING RECEIVER

CROSS REFERENCE TO RELATED APPLICATION

This application makes reference to, incorporates the same herein, and claims all benefits accruing under 35 U.S.C. §119 from an application for *Method And Apparatus For Saving Battery Power In A Paging Receiver* earlier filed in the Korean Industrial Property Office on Jun. 28, 1995 and there duly assigned Ser. No. 17845/1995.

BACKGROUND OF THE INVENTION

1. Field of the Invention

The present invention relates to a method and apparatus for saving battery power in a paging receiver, and more particularly to a method and apparatus for saving battery power when an initial preamble has been detected.

2. Description of the Related Art

In a conventional paging receiver, a receiving unit receives paging information and performs frequency conversion, demodulation, a waveform shaping operations on the paging information. This information is then converted into digital data which is subsequently decoded in a decoding unit.

In order to conserve power in the paging receiver, a battery controller is provided for operating the paging receiver in two modes, a first idle mode in which power is conserved and a second batch mode in which power is applied to the paging receiver so as to place it in a operative state allowing it to detect the various codes in the standard data transmission for the paging receiver.

Yung et al., U.S. Pat. No. 5,497,145, is but one example of such a conventional paging receiver.

The paging receiver disclosed in Yung et al. decodes the preamble of a standard POCSAG code (i.e. the Post Office Code Standardization Advisory Group code).

After detecting the preamble, the device disclosed in Yung et al. inactivates the receiver circuit for a predetermined period of time in order to conserve power.

However, it is necessary for the receiver in Yung et al. to be activated for the entire 576 bit duration of the preamble in order to allow it to detect the preamble, thereby reducing the battery saving efficiency of Yung et al.

To improve this situation, Romero, U.S. Pat. No. 5,376,975, only activates the paging receiver for predetermined portions of the preamble and is therefore capable of reducing the power consumption by a significant amount during the time of transmission of the preamble.

I have found however, that paging receivers such as represented by these references continue to consume electrical power after detection of the initial preamble, a loss of energy that can be operationally significant when the battery is in a partially discharged state.

SUMMARY OF THE INVENTION

An object of the present invention is, therefore, to provide a method and apparatus for saving battery power in a paging receiver, and more particularly, to a method and apparatus for saving battery power by turning off the power until the end of a preamble, if an initial preamble is detected.

It is still another object to provide a paging receiver and energy conserving process of turning the power off to the paging receiver after only detecting the initial preamble and then subsequently turning the power only on at the end of the entire preamble, thereby substantially reducing the power consumption of the paging receiver.

Another object of the present invention is to provide a method and apparatus for saving battery power in a paging receiver, wherein, if an initial preamble is detected while in an idle mode, the power is turned off during the remaining preamble period and then the power is supplied at the reception of the wordsync data, and if not, the power is turned on until the wordsync data is detected.

To achieve the above objects of the present invention, a method and apparatus for saving battery power in paging receiver includes: supplying power for a predetermined time period in an idle mode; checking whether or not data received during the predetermined time period is preamble data; if it is determined that the received data is preamble data, checking whether or not the preamble data is an initial preamble; if it is determined that the preamble data is an initial preamble, turning off the power until the end of the preamble data; at the end of the preamble data, turning on the power and then detecting wordsync data.

BRIEF DESCRIPTION OF THE DRAWINGS

These and various other features and advantages of the present invention will be readily understood with reference to the following detailed description taken in conjunction with the accompanying drawings, in which.

DETAILED DESCRIPTION OF THE PREFERRED EMBODIMENT

In the following description of the present invention, numerous specific details are set forth in order to provide a thorough understanding of the present invention. It will be understood by those skilled in the art that other embodiments of the present invention may be practiced without these specific details, or with alternative specific details, without departing from the central spirit or scope of the present invention. It should be noted that the same parts or elements of the drawings represent the same number or symbol wherever possible.

The term "initial preamble" as used herein refers to a preamble containing an end of TX data, i.e., a start of the preamble. The end of TX data is generated as a binary "1" or "0" in an idle mode. In the present invention, it is assumed that the end of TX data is a "1".

Figure 1:
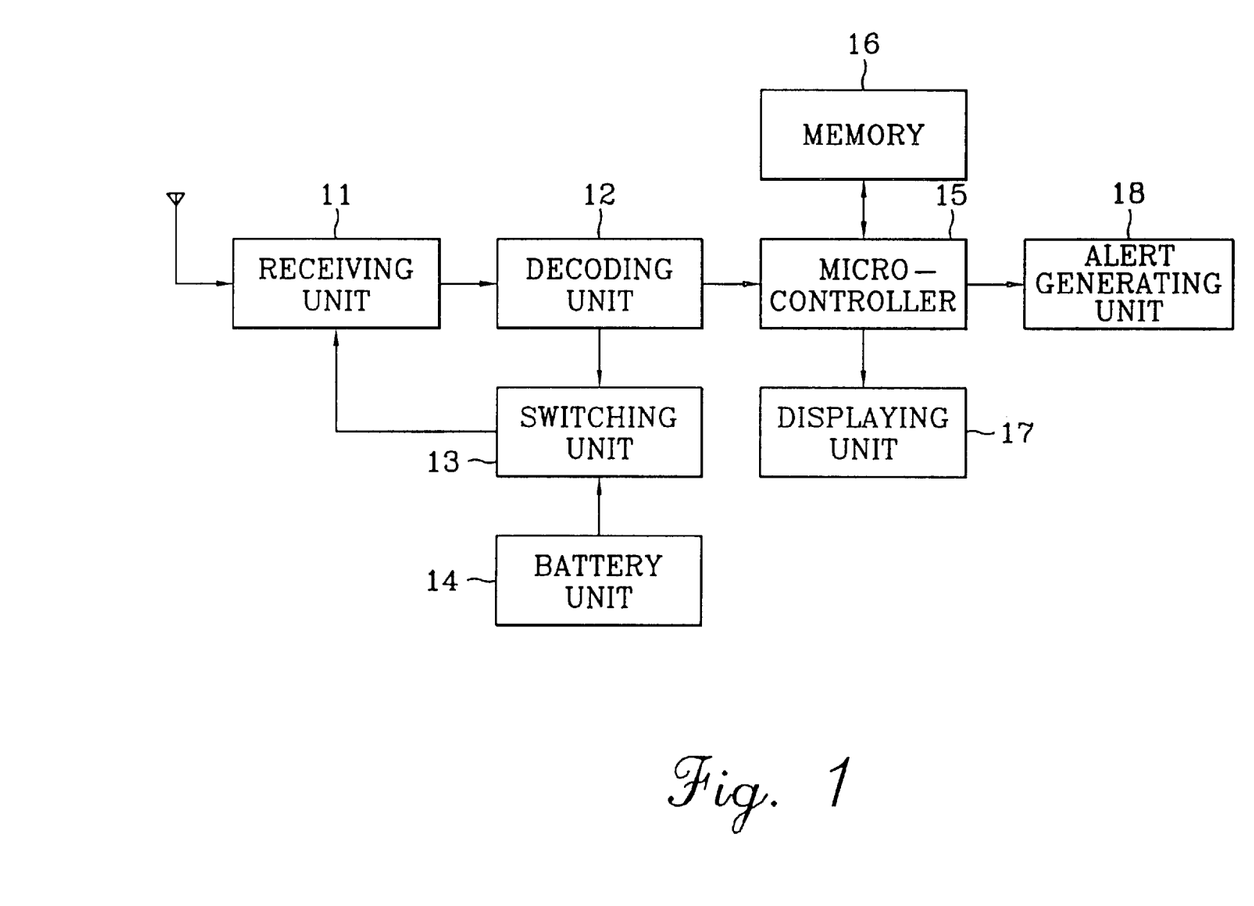
FIG. 1 is a block diagram showing a general configuration of a paging receiver.

FIG. 1 shows a general configuration of a paging receiver. Referring to FIG. 1, a receiving unit 11 receives paging information and performs frequency conversion, demodulation, and waveform shaping operations on the paging information. That is, the receiving unit 11 provides the paging information, which is converted into digital data, to a decoding unit 12. The decoding unit 12 has a battery controller for setting a battery control mode of the paging receiver, and a BCH decoder for decoding the received data. In other words, the decoding unit 12 controls the supply of power at a predetermined time period in order to detect preamble data in an idle mode, and to detect wordsync data and preset frame data in a batch mode. The BCH decoder of the decoding unit 12 decodes the detected frame data and performs a data conversion operation. A microcontroller 15 receives the decoded data from the decoding unit 12, processes the received data and controls the alerting operation. An alert generating unit 18 generates an alert signal, for example, a tone signal or a vibration signal, for informing the user of his being paged in response to an alert control signal output from the microcontroller 15. A displaying unit 17 displays a message from a calling party and information regarding the operating state of the paging receiver in response to a display control signal output from the microcontroller 15. A memory 16 stores inherent address information and frame information assigned to the paging receiver.

The format of the Post Office Code Standardization Advisory Group (POCSAG) is discussed below with reference to FIG. 2.

Figure 2:
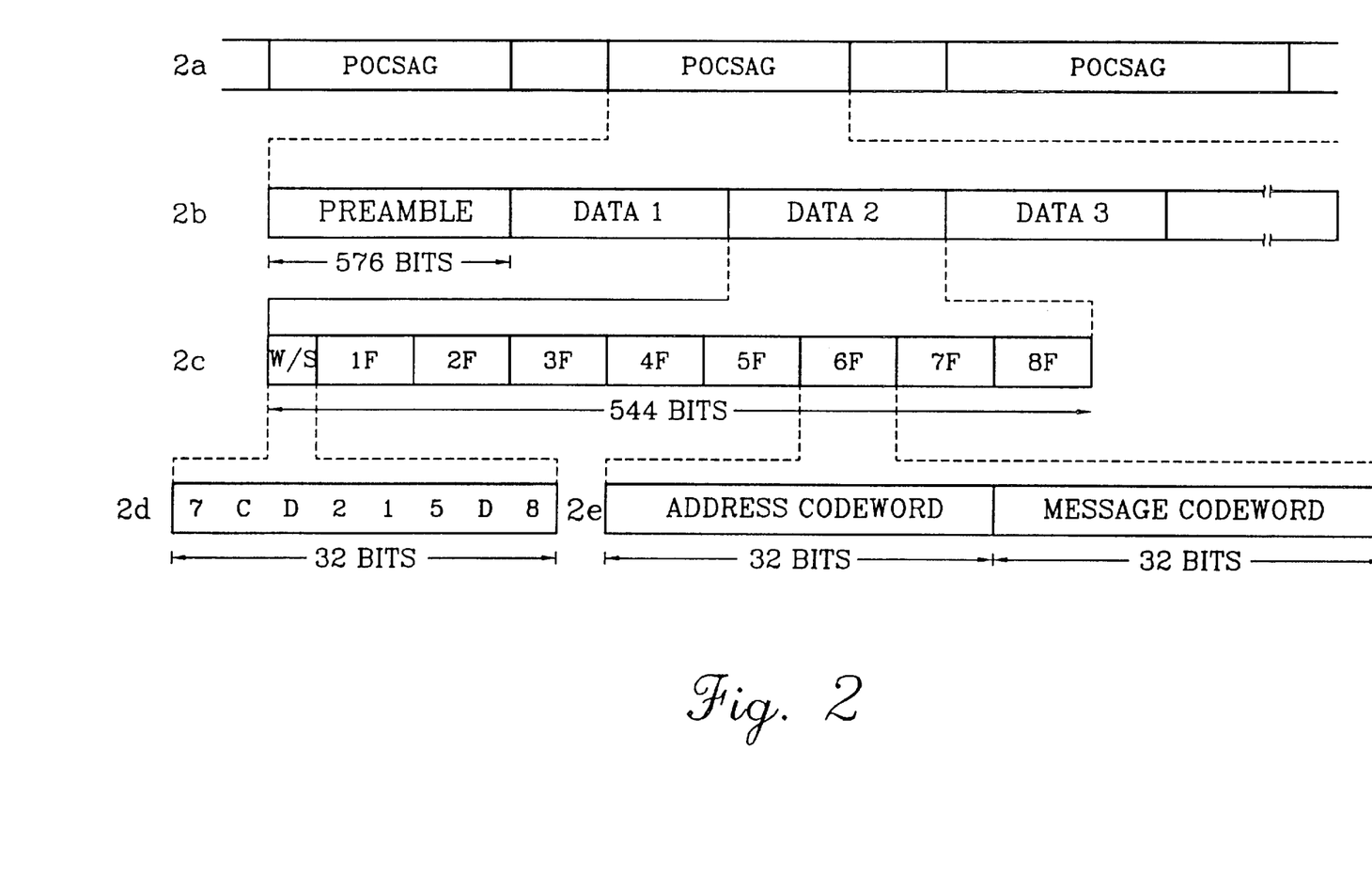
FIG. 2 is a format representative of the POCSAG code.

The POCSAG code is generated as shown in 2a of FIG. 2. A single element of POCSAG code is composed of preamble data consisting of 576 bits, and a plurality of batch data which follow the preamble data, as shown in 2b of FIG. 2. Typically, the preamble data is a reversal code comprised of a repetitive pattern of binary "1"s and "0"s. The single element of POCSAG code contains from 30 (normal) to 60 (maximum) batches. One batch consists of a wordsync data word of 32 bits and eight frame data words each composed of 64 bits as shown in 2c of FIG. 2. The wordsync data word having 32 bits is comprised of "(7CD215D8)H=(01111100 11010010000101011101100)B" as shown in 2d of FIG. 2. Each of the frame data words is comprised of 32 bits of address codeword and 32 bits of message codeword, as shown in 2e of FIG. 2. Therefore, one batch contains an amount of data equal to 17 words each composed of 32 bits of data, i.e., 544 bits of data(17 words×32 bits=544 bits).

Figure 3A:
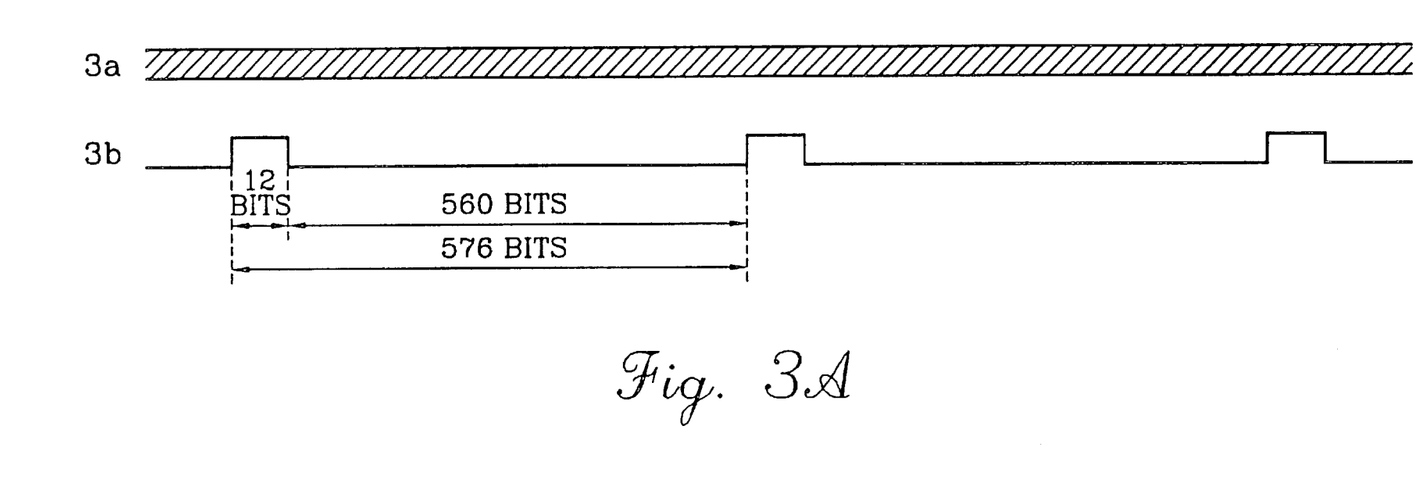
FIGS. 3A and 3B are timing charts showing characteristics of battery control in an idle mode and in a batch mode, respectively, in the paging receiver.
Figure 3B:
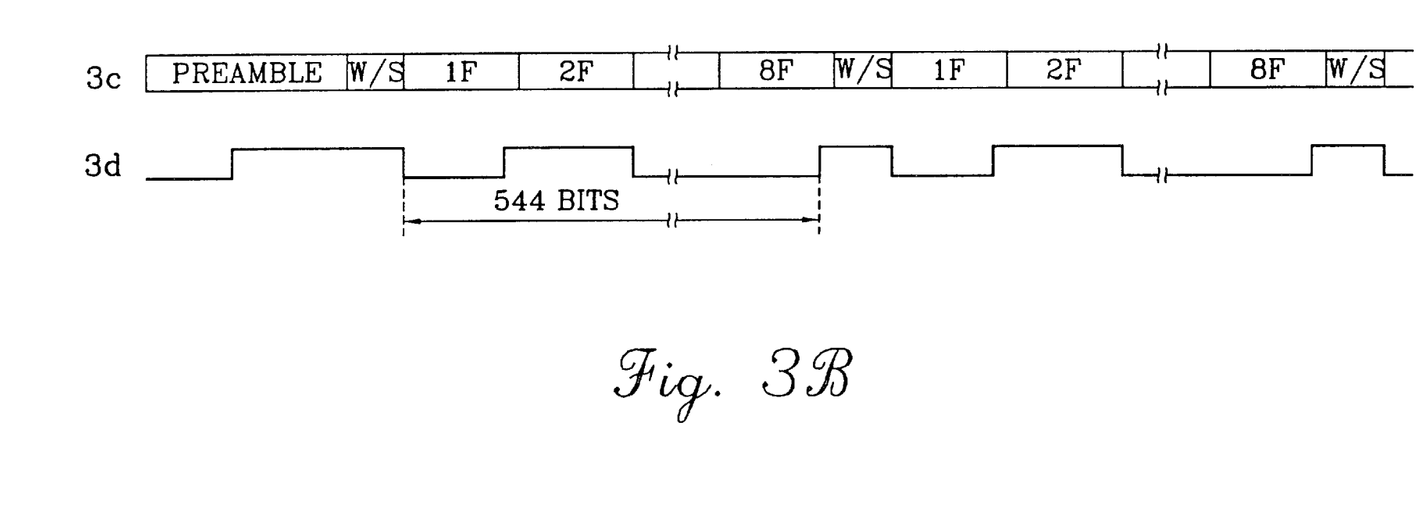

FIGS. 3A and 3B are timing charts showing characteristics of battery control operation in an idle mode and in a batch mode, respectively, in the paging receiver. Referring to FIG. 3A, the preamble data is comprised of 576 bits having a repetitive pattern of binary "1"s and "0"s. If power is supplied at a predetermined time period of 576 bits, reception of the preamble data can be detected. That is, as shown in 3a of FIG. 3A, if the POCSAG code is not received, the decoding unit 12 enables the idle mode to be executed. Thus, in a repetitive and sequential manner, the decoding unit 12 supplies the power during a time interval corresponding to a K bit period (assuming that K is 32 in the present invention) of a 576 bit period and turns off the power during a time interval corresponding to a 544 bit period (576 bit period—L bit period) of the 576 bit period, as shown in 3b of FIG. 3A. If the preamble data is received during these operations, the decoding unit 12 detects 12 bits of preamble at the K bit period when power is supplied in the idle mode, thereby detecting reception of the POCSAG code.

Referring to FIG. 3B, the batch mode is executed by the decoding unit 12 after detection of the preamble data. That is, as shown in 3c of FIG. 3B, when the POCSAG code is received, the decoding unit 12 controls the supply of power, as shown in 3d of FIG. 3B, while detecting the wordsync data and a preset frame data. In other words, the decoding unit 12 generates the power control signal to detect the 32 bits of wordsync data and the 64 bits of codeword of the preset frame data for one batch. During this time, the decoding unit 12 does not supply power at the precise starting points of the wordsync and preset frame data periods, but supplies power at a predetermined bit period before the starting points of the wordsync and frame data periods. This predetermined bit period is typically 8 bits or 16 bits, and enables accurate reception of the wordsync data and frame codeword.

Figure 4:
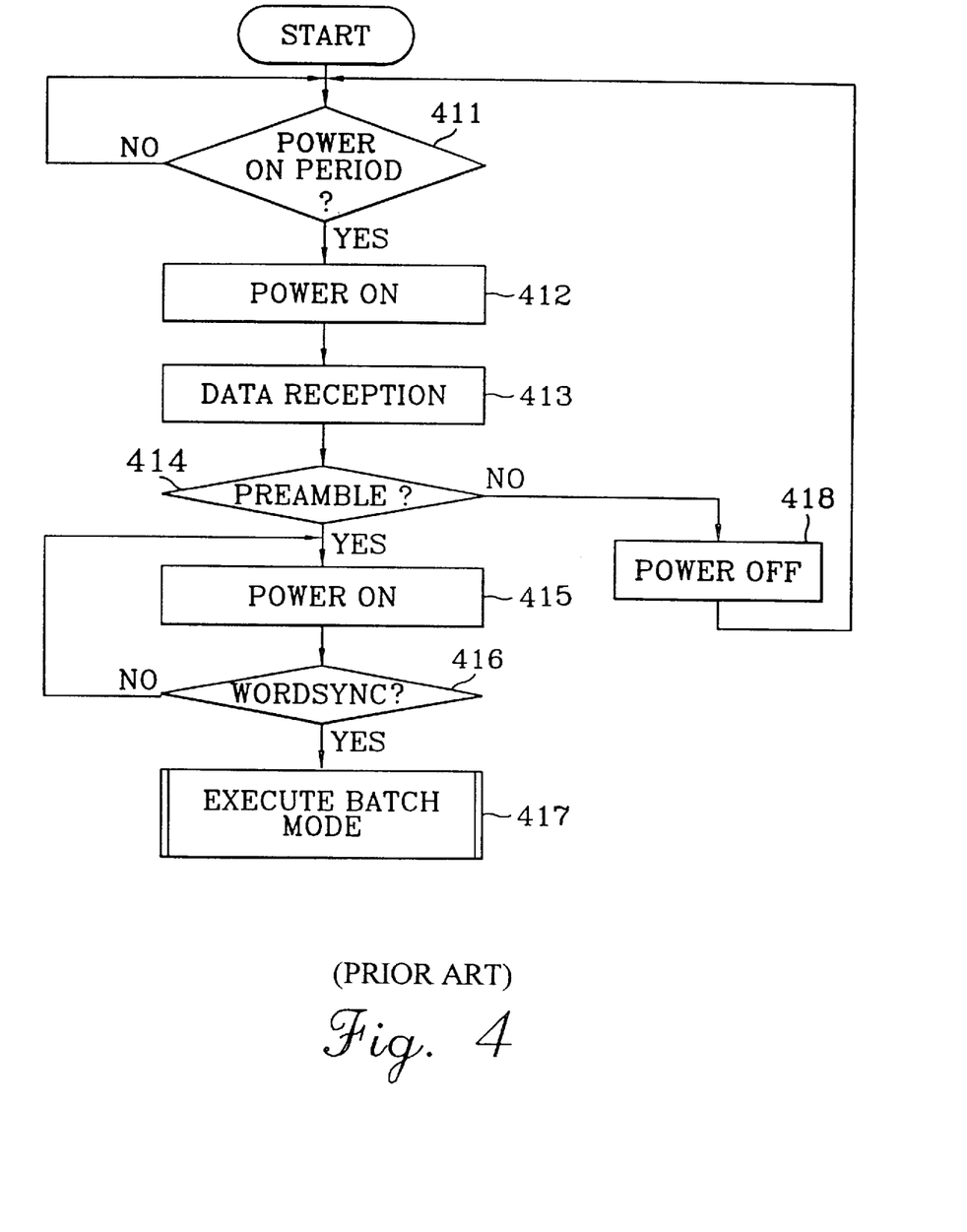
FIG. 4 is a flowchart showing a power supply control operation in a prior art paging receiver.

FIG. 4 is a flowchart showing a power supply control operation in the idle mode in the paging receiver according to a prior art. In the idle mode, the decoding unit 12 checks in step 411 whether or not it is in a power-on period. If it is determined that it is in a power-on period, in step 412, the decoding unit 12 controls the switching unit 13 to supply the power to the receiving unit 11 for the K bit period. The receiving unit 11 then amplifies an RF signal received through an antenna, converts its frequency and demodulates it. Then, in step 413, the decoding unit 12 receives and stores N bits of data from the receiving unit 11. It is assumed in the present invention that N bits are 12 bits. In addition, a shift register may be used as a storing circuit for storing the N bits of data as shown in 5d of FIG. 5. If the 12 bits of data is received, the decoding unit 12 checks in step 414 whether or not the received data is preamble data. Since the preamble data is comprised of a reversal code where bits of logic "1"s and "0"s are repeated, whether or not the received data is preamble data can be checked by logic-operating the output of the storing circuit. If it is determined in step 414 that the received data is not preamble data, in step 418, the decoding unit 12 controls the switching unit 13 to turn off the power by isolating the path between the battery unit 14 and receiving unit 11, and then returns to step 411.

If it is determined in step 414 that the received data is preamble data, the decoding unit 12 controls the switching unit 13 to maintain the power-on state in step 415. In step 416, the decoding unit 12 checks whether or not the wordsync data has been detected. If it is determined in step 416 that the wordsync data has been detected, the decoding unit 12 executes the batch mode in step 417. If it is determined that the wordsync data has not been detected, the decoding unit 12 returns to step 415.

Figure 5:
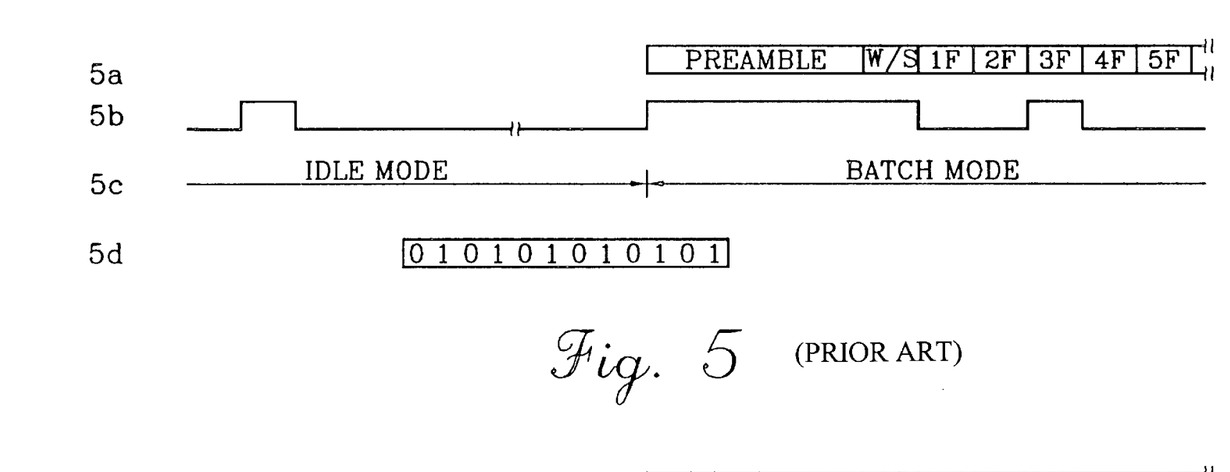
FIG. 5 is a chart showing timing characteristics of controlling the power supply in a prior art paging receiver.

As described above, in a prior art paging receiver, if the preamble data has been detected, the decoding unit 12 continuously supplies the power until the wordsync data is detected, as can be seen in 5b of FIG. 5. The preamble data is a 576 bit period and functions to signal that data will be received right after the preamble data. Thus, the decoding unit 12 does not have to continuously supply power is after detecting the preamble data and before detecting the wordsync data. Therefore, the prior art paging receiver as described above has a problem of low battery saving efficiency.

A paging receiver in accordance with the present invention has the same construction and reference numerals as that shown in FIG. 1. In addition, the data format used in the paging receiver of the present invention is identical to that shown in FIG. 2.

Figure 6:
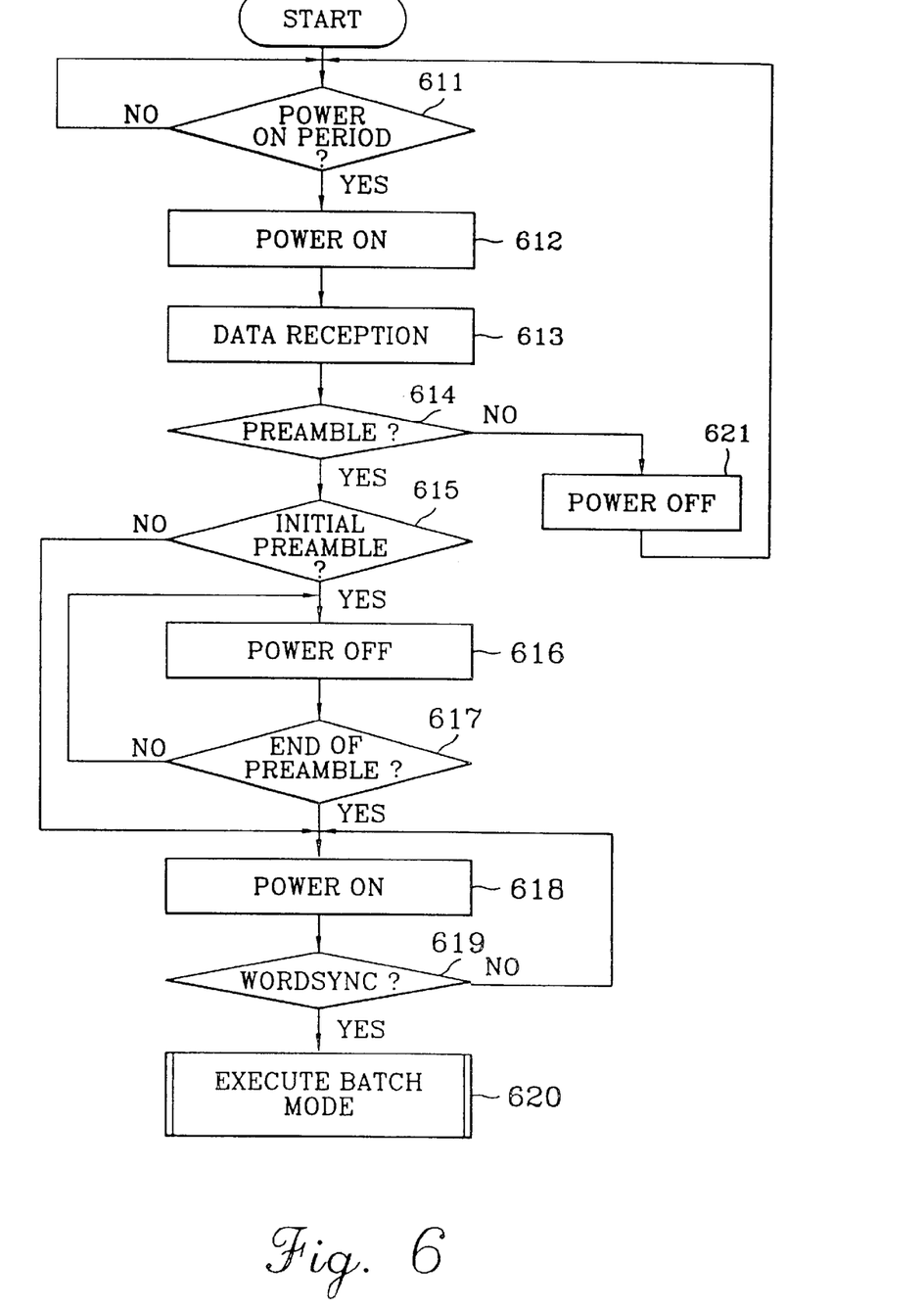
FIG. 6 is a flowchart showing a power supply control operation in the paging receiver according to the present invention.

FIG. 6 is a flowchart showing a power supply control operation in the paging receiver according to the present invention.

Figure 7:
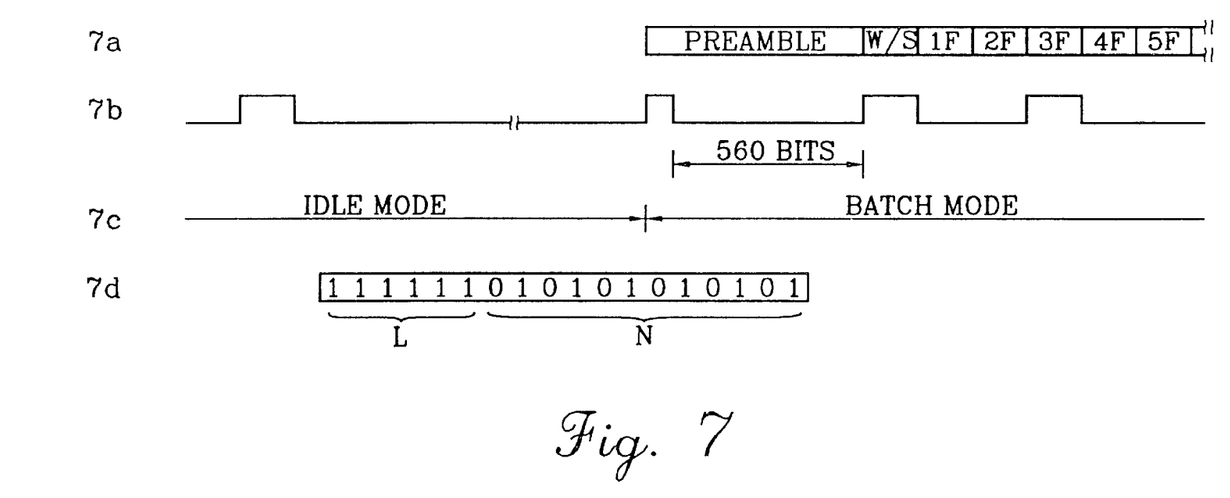
FIG. 7 is a chart showing timing characteristics of controlling the power supply in the paging receiver according to the present invention.

FIG. 7 is a chart showing the timing characteristics of controlling the power supply in the paging receiver according to the present invention. That is, FIG. 7 shows the timing characteristics for saving battery power by, if an initial preamble is detected, turning off the power during the remaining preamble period and then supplying the power only at the end of the preamble to detect a wordsync.

In the paging receiver, the decoding unit 12 controls the power supply so as to be on for a predetermined time period in the idle mode. If N bits of preamble are received, it is assumed in the present invention that the preamble has been detected. Further, it is assumed in the present invention that the N bits are 12 bits and the period when the power is supplied in the idle mode is an M bit period. In this case, M must be greater than N so as to determine whether or not the received preamble is an initial preamble.

In the idle mode, the decoding unit 12 checks in step 611 whether or not it is in a power-on period. If it is determined that it is a power-on period, the decoding unit 12 turns on the power during the M bit period in step 612. The receiving unit 11 then converts an RF signal received through an antenna into digital data and then outputs the digital data to the decoding unit 12. The decoding unit 12 receives the M bits of data and stores it in a preamble buffer as shown in 7d of FIG. 7. The preamble buffer may be a shift register comprised of N+L(N<N+L≦M) bits. The shift register requires additional L bits to determine whether or not the stored data is an initial preamble. In step 614, the decoding unit 12 analyzes the data stored at the preamble buffer to check whether or not the data stored in the N bit region of the preamble buffer is a preamble. If it is determined in step 614 that the data is not a preamble, in step 621, the decoding unit 12 controls the switching unit 13 to turn off the power and then returns to step 611.

However, if it is determined in step 614 that the data stored at the N bit region of the preamble buffer is a preamble, then the decoding unit 12 checks in step 615 whether or not the data stored at the L bit region of the preamble buffer contains the end of TX data. If the data contains the end of TX data, this means that the data is the initial preamble. If the data is the initial preamble, then the decoding unit 12 turns off the power until the end of the preamble in step 616. Since the preamble is comprised of 576 bits, the N bits for detecting the preamble are 12 bits and L bits for detecting the initial preamble are 8 bits, the period from the starting point of detecting the initial preamble to the end of the preamble corresponds to at least 556 bits. Therefore, the turning off of the power during the about 550 bit period after the detection of the initial preamble does not affect the operations of the paging receiver.

In step 617, the decoding unit 12 checks whether or not it has reached the end of the preamble. If it is determined that it has reached the end of the preamble, the decoding unit 12 controls the switching unit 13 to supply the power to the receiving unit 11 in step 618. Thus, if the initial preamble is detected, the power supply is controlled as shown in 7b of FIG. 7, enabling the saving of battery power. If the wordsync data is detected after the supply of power in step 619, the decoding unit 12 proceeds to step 620 to execute the batch mode.

If the L bits of data at the second region of the preamble buffer is a preamble, this means that the detected preamble is not the initial preamble. In this case, it is impossible to recognize at which point the wordsync is received, and thus the power is continuously supplied in the same way as the prior art paging receiver. Therefore, if it is determined in step 615 that the stored data is not the initial preamble, the decoding unit 12 proceeds to step 618 and continuously supplies the power to detect the wordsync data.

While there has been illustrated and described what is considered to be a preferred embodiment of the present invention, it will be understood by those skilled in the art that various changes and modifications may be made without departing from the scope of the present invention. Therefore, it is intended that the present invention not be limited to the particular embodiment disclosed as the best mode contemplated for carrying out the present invention, but that the present invention includes all of the embodiments falling within the scope of the appended claims.

What is claimed is:

1. A method of saving battery power in a paging receiver, said method comprising the steps of:

supplying power to the receiver for a predetermined time period in an idle mode;

analyzing data received during said predetermined time period and checking whether or not said data is a preamble;

if it is determined that said data is a preamble, checking whether or not said preamble is an initial preamble;

if it is determined that said preamble is an initial preamble, turning off the supplied power until an end of said preamble; and at the end of said preamble, supplying the power to the receiver to detect wordsync data.

2. The method of saving battery power as claimed in claim 1, wherein said initial preamble contains an end of TX data.

3. A method of saving battery power in a paging receiver having an idle mode and a batch mode, said method comprising the steps of:

supplying power to the receiver for a predetermined time period in said idle mode and for storing received data in a preamble buffer;

analyzing data stored in a first region of said preamble buffer so as to determine whether or not said data stored in said first region is a preamble;

if it is determined that said data stored in said first region is not a preamble, turning off the supplied power and changing to said idle mode;

if it is determined that said data stored in said first region is a preamble, analyzing data stored in a second region of said preamble buffer and checking whether or not said data stored in said second region is an initial preamble by checking whether or not said data stored in said second region contains an end of TX data;

if it is determined that said data stored in said second region is an initial preamble, turning off the supplied power until the end of said preamble, and at the end of said preamble, supplying the power to the receiver to detect wordsync data and then changing to said batch mode; and if it is determined that said data stored in said second region of said preamble buffer is not an initial preamble, continue supplying power to the receiver to detect the wordsync data and after the detection of said wordsync data, changing to said batch mode.

4. The method of saving power as claimed in claim 3, said received data being sequentially stored in said preamble buffer from said second region to said first region.

5. An apparatus for saving battery power in a paging receiver, said apparatus comprising:

a switching unit connected to a source of power for supplying power to the receiver for a predetermined time period in an idle mode;

a decoding unit connected to said switching unit for analyzing data received during said predetermined time period and for checking whether or not said data is a preamble;

said decoding unit checking whether or not said preamble is an initial preamble if it has determined that said data is a preamble;

said decoding unit turning off the supplied power until an end of said preamble if it has determined that said preamble is an initial preamble; and said decoding unit controlling said switching unit to supply the power to the receiver to detect wordsync data at the end of said preamble.

6. The apparatus for saving battery power as claimed in claim 5, wherein decoder determines that said preamble is said initial preamble by detecting an end of TX data in said preamble.

7. An apparatus for saving battery power in a paging receiver having an idle mode and a batch mode, said apparatus comprising:

a switching unit connected to a source of power for supplying power to the receiver for a predetermined time period in said idle mode and for storing received data in a preamble buffer;

a decoding unit connected to said switching unit for analyzing data stored in a first region of said preamble buffer so as to determine whether or not said data stored in said first region is a preamble;

said decoding unit turning off the supplied power and changing to said idle mode if it has determined that said data stored in said first region is not a preamble;

said decoding unit analyzing data stored in a second region of said preamble buffer and checking whether or not said data stored in said second region is an initial preamble by checking whether or not said data stored in said second region contains an end of TX data if it has determined that said data stored in said first region is a preamble;

said decoding unit controlling said switching unit to turn off the supplied power until the end of said preamble, and at the end of said preamble, to supply the power to the receiver to detect wordsync data and then changing to said batch mode if it has determined that said data stored in said second region is an initial preamble; and said decoding unit controlling said switching unit to continue supplying power to the receiver to detect the wordsync data and, after the detection of said wordsync data, changing to said batch mode if it has determined that said data stored in said second region of said preamble buffer is not an initial preamble.

8. The apparatus for saving power as claimed in claim 7, said received data being sequentially stored in said preamble buffer by said switching unit from said second region to said first region.

* * * * *